United States Patent
Kim et al.

(10) Patent No.: US 8,988,479 B2
(45) Date of Patent: Mar. 24, 2015

(54) RECORDING VIDEO CONVERSATIONS AND DISPLAYING A LIST OF RECORDED VIDEOS WITH CALLER IDENTIFICATION INFORMATION

(75) Inventors: Tae Seong Kim, Seoul (KR); Yeon Woo Park, Seoul (KR)

(73) Assignee: LG Electronics Inc., Seoul (KR)

(*) Notice: Subject to any disclaimer, the term of this patent is extended or adjusted under 35 U.S.C. 154(b) by 1517 days.

(21) Appl. No.: 12/062,365

(22) Filed: Apr. 3, 2008

(65) Prior Publication Data

US 2008/0246831 A1    Oct. 9, 2008

(30) Foreign Application Priority Data

Apr. 9, 2007 (KR) .................... 10-2007-0034643

(51) Int. Cl.
- *H04N 7/14* (2006.01)
- *H04M 3/42* (2006.01)
- *H04B 1/00* (2006.01)

(52) U.S. Cl.
CPC .................................. *H04N 7/147* (2013.01)
USPC ............... 348/14.02; 455/414.2; 455/415; 455/566

(58) Field of Classification Search
CPC ...................... H04N 2007/145; H04W 4/00
USPC .............. 348/14.01, 14.02; 455/414.1, 414.2, 455/414.3, 415, 566
See application file for complete search history.

(56) References Cited

U.S. PATENT DOCUMENTS

| | | | |
|---|---|---|---|
| 8,326,115 B2* | 12/2012 | Murakoshi et al. | 386/241 |
| 8,868,045 B2* | 10/2014 | Vander Veen et al. | 455/412.2 |
| 2003/0032447 A1* | 2/2003 | Bulthuis | 455/556 |
| 2004/0204194 A1* | 10/2004 | Akai et al. | 455/575.1 |
| 2005/0190188 A1* | 9/2005 | Anzawa et al. | 345/474 |
| 2005/0275715 A1* | 12/2005 | Shingu et al. | 348/14.07 |
| 2006/0058057 A1* | 3/2006 | Holloway et al. | 455/550.1 |
| 2006/0115233 A1* | 6/2006 | Liu et al. | 386/52 |
| 2007/0030524 A1* | 2/2007 | Murakoshi | 358/403 |
| 2007/0136750 A1* | 6/2007 | Abanami et al. | 725/44 |
| 2007/0216761 A1* | 9/2007 | Gronner et al. | 348/14.02 |
| 2009/0100462 A1* | 4/2009 | Park et al. | 725/38 |

FOREIGN PATENT DOCUMENTS

| | | |
|---|---|---|
| JP | 2001-186234 A | 7/2001 |
| JP | 2001-186279 A | 7/2001 |
| KR | 10-2003-0005602 A | 1/2003 |
| KR | 10-2006-0036186 A | 4/2006 |

* cited by examiner

*Primary Examiner* — Christopher M Brandt
(74) *Attorney, Agent, or Firm* — Birch, Stewart, Kolasch & Birch, LLP

(57) ABSTRACT

A video communication method, computer program product and video communication terminal implementing the same are disclosed, by which a terminal user is assisted by identifying what kind of conversation he had with a specific correspondent user by reading a phone call list on a terminal. The present invention includes a step of accessing the video communication, a step of storing a video of the video communication, and a step of displaying a communication list item of the video communication together with the stored video.

22 Claims, 21 Drawing Sheets

(4d-1)　　　　　　　(4d-2)

(6a-1)

(5a-2)

(6a-3)

(7-1)

(7-2)

(8b-1)

(8b-2)

RECORDING VIDEO CONVERSATIONS AND DISPLAYING A LIST OF RECORDED VIDEOS WITH CALLER IDENTIFICATION INFORMATION

CROSS REFERENCE TO RELATED APPLICATIONS

This application claims the benefit of the Korean Patent Application No. 10-20070034643, filed on Apr. 9, 2007, which is hereby incorporated by reference as if fully set forth herein.

BACKGROUND OF THE INVENTION

1. Field of the Invention

The present invention relates to video communication, and more particularly, to a video communication method and a computer program product and video communication terminal implementing the same. Although the present invention is suitable for a wide scope of applications, it is particularly suitable for enabling images in video communication to be used by considering terminal user's convenience.

2. Discussion of the Related Art

Generally, the great developments of information communication and broadcasting field bring rapid transitions of information communication and broadcasting environments. And, mobile terminals are globally used as necessity for the modern society.

The recently accelerated development of the communication technology introduces terminals enabling users to perform video communication by viewing faces of correspondent users via images. Namely, these terminals are called video communication terminals.

However, a terminal user making many phone calls a day has difficulty in memorizing what kind of conversation he had and/or who he spoke to one by one despite having a call list displayed on a terminal.

SUMMARY OF THE INVENTION

Accordingly, the present invention is directed to a video communication method and a computer program product and video communication terminal implementing the same that substantially obviate one or more problems due to limitations and disadvantages of the related art.

An object of the present invention is to provide a video communication method and a computer program product and video communication terminal implementing the same, by which a terminal user is facilitated to know what kind of conversation he had with a specific correspondent user by reading a phone call list on a terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a computer program product and a method of performing video communication in a video communication terminal according to the present invention includes a video communication establishing step of establishing the video communication, a video storing step of storing a video of the video communication, and a communication list item displaying step of displaying a communication list item of the video communication together with the stored video.

In another aspect of the present invention, a video communication terminal according to the present invention includes a communication unit for video communication, a memory unit for storing a communication list item of the video communication and a video of the video communication, a display unit displaying the communication list item of the video communication and the video of the video communication, and a control unit controlling the stored video to be displayed when the communication list item of the video communication is displayed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The present invention is applicable to various kinds of terminals including a mobile phone, a smart phone, a broadcast receiving terminal, a PDA (personal digital assistant), PDA phone, a game player, a notebook computer, a UMPC, etc. For convenience and conciseness of the following description, the present invention uses a mobile phone as an example of portable terminal, which does not restrict the scope of the present invention.

A configuration of a mobile terminal according to the present invention is explained with reference to FIG. 1 as follows.

Figure 1:
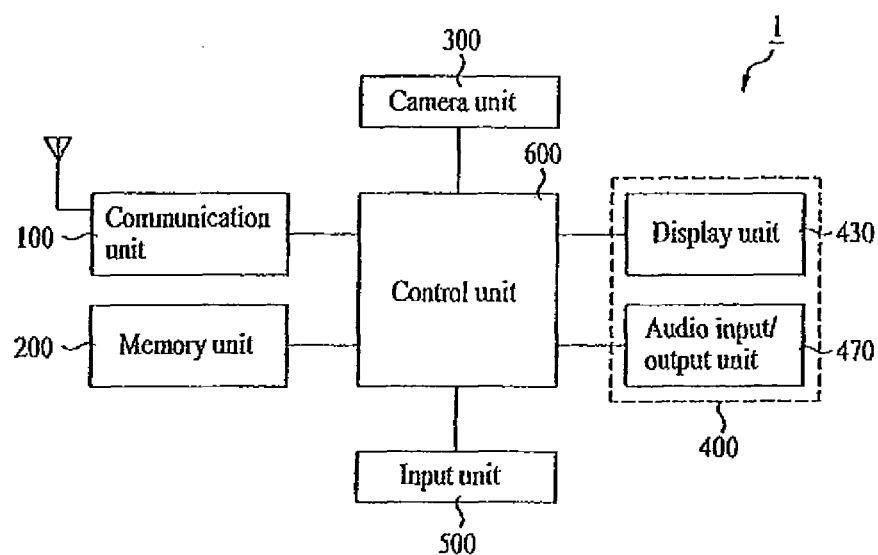
FIG. 1 is a schematic block diagram of a mobile terminal according to the present invention.

FIG. 1 is a schematic block diagram of a mobile terminal according to the present invention.

Referring to FIG. 1, a mobile terminal 1 according to the present invention may preferably include a communication unit 100, a memory unit 200, a camera unit 300, a video communication unit 400, and input unit 500, and a control unit 600.

It is understood that the mobile terminal according to the present invention may include more elements (e.g., a battery unit, etc.) that are not directly associated with the present invention. For clarity, details thereof shall be omitted in the following description.

In implementing the respective elements for real application, at least two of the elements are combined into one or one element can be subdivided into at least two elements.

The above elements of the mobile terminal are explained one by one as follows.

First of all, the communication unit 100 preferably enables the mobile terminal 1 to perform video communication with a terminal of a third party via a mobile communication network.

In particular, while a terminal user is speaking to a correspondent user through a video communication session using the mobile terminal 1, the communication unit 100 sends an image captured by the camera unit 300 to the correspondent user and also receives the correspondent user's image from the correspondent user if necessary. It is understood that the communication unit 100 is capable of supporting normal voice communication.

The memory unit 200 stores various kinds of software and corresponding data to drive various function provided by the mobile terminal 1.

In particular, the memory unit 200 is capable of storing at least one selected from the group consisting of user image, user voice, correspondent user image, and correspondent user voice in the course of video communication session. And, the memory unit 200 is capable of storing a communication list of the video communication session to indicate when a user made a phone call, whom a user spoke to, and the like.

The camera unit 300 is provided to capture a still picture or a moving picture. Preferably, the camera unit 300 is arranged to capture a figure of a terminal user in performing video communication.

Optionally, the mobile terminal 1 further includes at least one camera unit (not shown in the drawing) as well as the former camera unit 300, thereby providing a correspondent user with another scene captured by the further included at least one camera unit in the course of the video communication session.

The video communication unit 400 includes a display unit 430 and an audio input/output unit 470.

The display unit 430 displays images according to various functions and real time activity of the mobile terminal 1. In case that the display unit 430 includes a touchscreen, it can play a role as an input unit for receiving various touch commands or information from the terminal user.

In particular, the display unit 430 displays images for the video communication session. In the following description, a reference number '430' will be designated to a screen of the display unit as well as the display unit for convenience if necessary.

The audio input/output unit 470 plays a role in inputting/outputting audio (e.g., voice) of the terminal user for the video communication session.

The input unit 500 (e.g., keypad) enables the terminal user to input various kinds of informations or commands to the mobile terminal 1. In case that the display unit 430 includes the touchscreen capable of playing a role of a separate input unit, the input unit 500 can be omitted from the configuration of the mobile terminal 1.

And, the control unit 700 controls the communication unit 100, the memory unit 200, the camera unit 300, the video communication unit 400, and the input unit 500, thereby implementing a video communication method, as explained in the following description, in the mobile terminal 1.

Embodiments for a communication connecting method according to the present invention are explained as follows.

First Embodiment

A video communication method according to a first embodiment of the present invention is explained with reference to FIGS. 2 to 8B.

Figure 2:
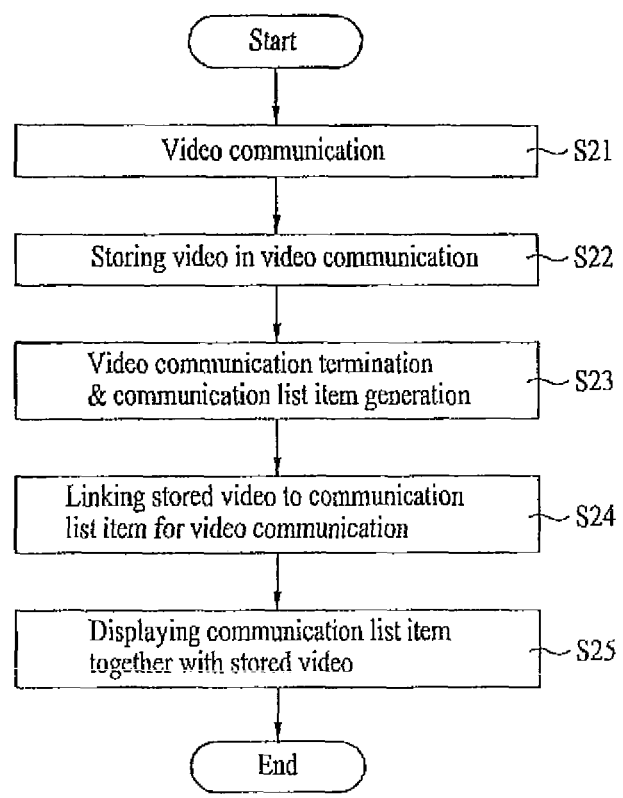
FIG. 2 is a schematic flowchart for a video communication method according to a first embodiment of the present invention.

FIG. 2 is a schematic flowchart for a video communication method according to a first embodiment of the present invention, and FIGS. 3 to 8B are diagrams of a screen of a display unit in a terminal that implements a video communication method according to a first embodiment of the present invention.

Figure 3:
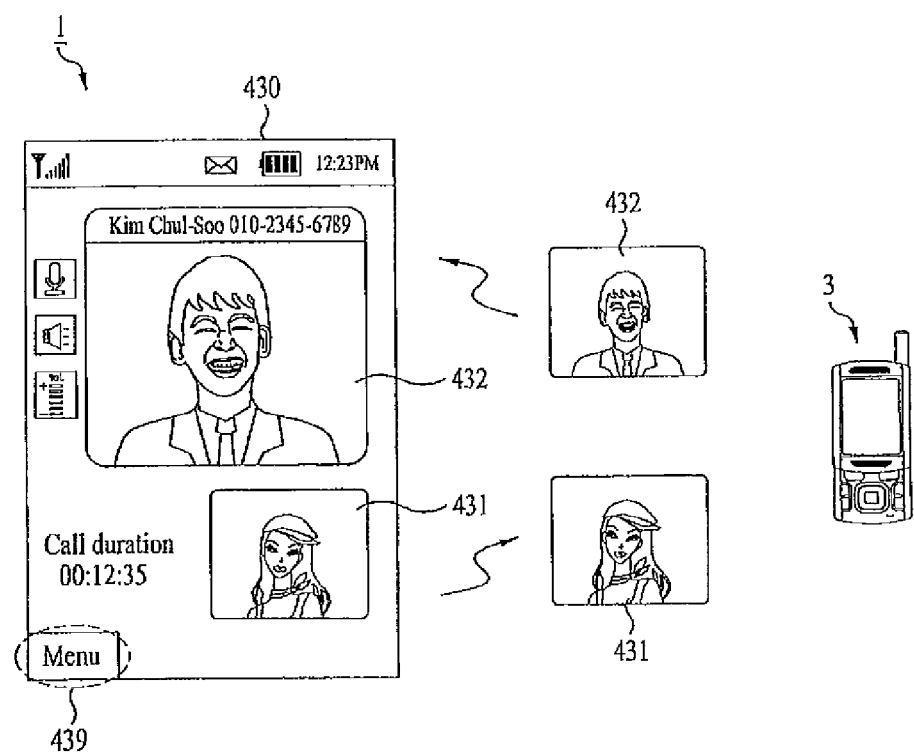
FIGS. 3 to 8B are diagrams of a screen of a display unit in a terminal that implements a video communication method according to a first embodiment of the present invention.

Referring to FIG. 3, the method begins with the mobile terminal 1 performing video communication with a correspondent terminal 3 [S21]. In doing so, the mobile terminal 1 captures a video 431 (hereinafter called 'transmission video') to be provided to the correspondent terminal 3 and then transmits the transmission video to the correspondent terminal 3. In doing so, the mobile terminal 1 receives a video 432 (hereinafter called 'reception video') from the correspondent terminal 3 and then displays the reception video on the display unit screen 430.

In the course of the video communication session, the mobile terminal stores at least one of the transmission video 431 and the reception video 432 [S22]. In this case, the stored video can be stored in a still picture format or a moving picture format.

The mobile terminal 1 can be configured to store the video once at a specific timing point (e.g., a communication start timing point) in the course of the video communication session or to store the video periodically (periodic timing points) in the course of communication.

Optionally, the mobile terminal 1 can be configured to store the video at a timing point that a specific event (e.g., message reception, etc.) takes place in the mobile terminal 1 in the course of the video communication session.

Optionally, the mobile terminal 1 can be configured to store the video at a specific timing point specified by the terminal user attempting to store the video.

Thus, it is able to configure the video to be stored at least one timing point selected from the group consisting of a predetermined time interval timing point, a specific event occurrence timing point in the video communication session, and a user-specific timing point.

Preferably, the mobile terminal 1 can be configured to store a communication audio (e.g., transmission sound and/or reception sound) corresponding to the video when the video is stored.

If the video communication session is terminated, a communication list item of the video communication session is generated and then stored in the mobile terminal 1 [S23].

Once the communication list item of the video communication session is stored, the stored communication list item is linked to the video stored in association with the video communication session [S24].

If the communication list item of the video communication session is requested to be displayed by the terminal user, it can be displayed as shown in FIGS. 4A to 9B [s25]. This is explained in turn as follows.

Figure 4A:
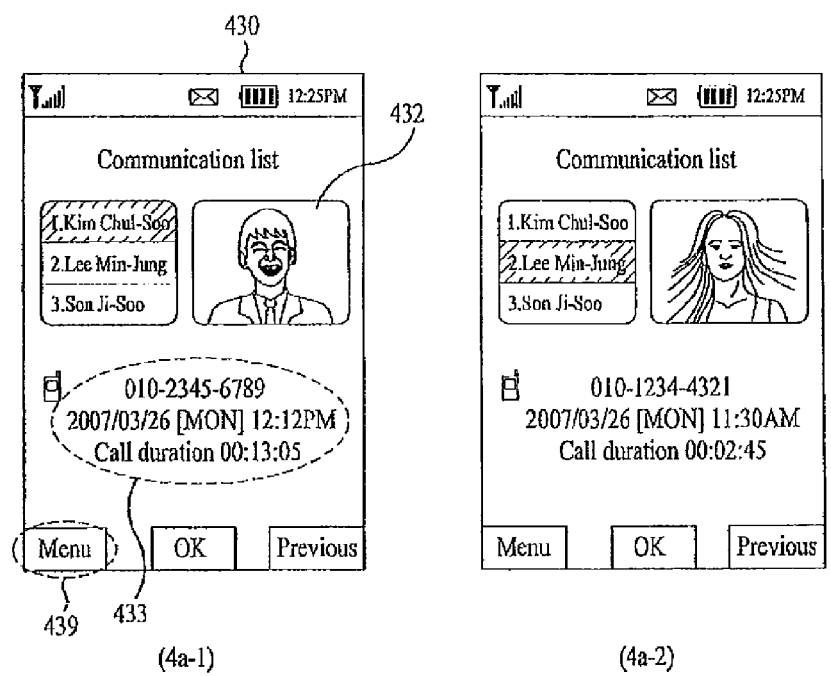

Referring to FIG. 4A, if the communication list item of the video communication session is selected to be displayed, detailed information 433 on the communication list item of the video communication session is displayed as soon as a video 432 to which the communication list item is linked is displayed. It is apparent to those skilled in the art that manipulations of a menu 439 via the input unit 500 are necessary to display the communication list item in the mobile terminal 1. For clarity, details for the manipulations of the menu 439 will be omitted in the following description.

In case that a plurality of videos are stored several times in the course of the video communication session, it is able to configure a plurality of the videos to be sequentially displayed periodically (for each predetermined time interval).

Optionally, it is able to configure the videos to be changed via manipulations of right and left key buttons of a navigation key (not shown in the drawing) of the input unit 500.

In case that the display unit 430 includes a touchscreen, it is able to configure the videos to be changed in a manner that a specifically displayed video 432 is simply touched on the display unit screen 430.

If a terminal user attempts to view a different communication list item, the terminal user selects the different communication list item through manipulations of right and left key buttons of a navigation key (not shown in the drawing) of the input unit 500. If so, a video and detailed information on the different communication list item, as shown in (4a-2) of FIG. 4A, are displayed.

In case that the display unit 430 includes the touchscreen, the specific different communication list item is simply touched on the display unit screen 430. So, a video and detailed information on the different communication list item can be viewed.

FIG. 4A shows a case that the reception video 432 is stored in the course of the video communication session.

Figure 4B:
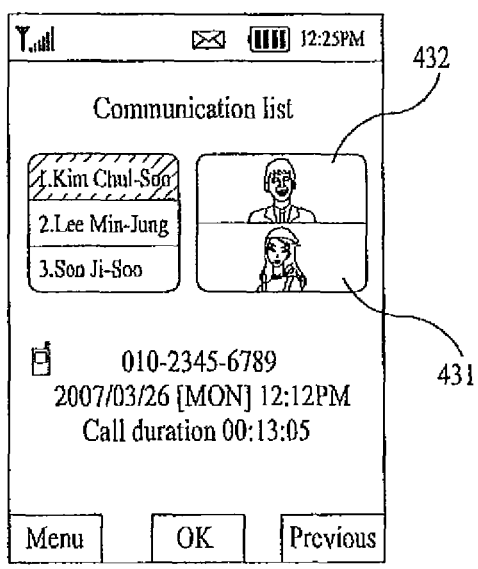

If both of the transmission video 431 and the reception video 432 are stored in the course of the video communication session, they can be simultaneously displayed as shown in FIG. 4B.

Figure 4C:

In case that the transmission video 431 is stored in the course of the video communication session, it is able to configure the stored transmission video 431 to be displayed as shown in FIG. 4C.

Figure 4D:
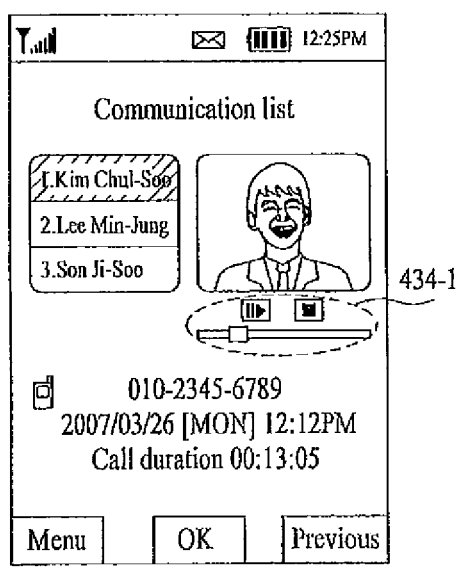
Figure 4D:
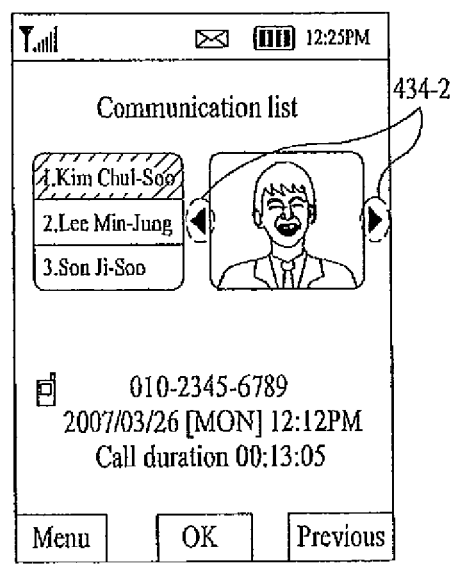

If the video is stored as a moving picture, it is preferable that the video, as shown in (4d-1) of FIG. 4D, is displayed together with a control key 434-1 for adjusting a playback of the moving picture. It is able to configure a manipulation of the control key 434 to be executed via the input unit 500.

Preferably, a manipulation of the control key 434-1 is executed in a manner that a terminal user directly touches the control key 434-1 when the display unit is implemented as a touchscreen.

In case that the video is played as a moving picture, a communication audio relevant to the video can be configured to be played together with the video. In case that the video is constructed with a plurality of still pictures, a control key 434-2 for adjusting a sequential playback of the still pictures, as shown in (4d-2) of FIG. 4D, is preferably displayed next to right and left sides of the displayed video 432.

As mentioned in the above description, in case that a video constructed with the moving picture or a plurality of the still pictures is displayed, the corresponding control key 434-1 or 434-2 can be displayed together with the video. This is applicable to the following embodiment of the present invention as well.

Figure 4E:

In case that a communication list item of voice communication instead of the video communication is requested to be displayed in the mobile terminal 1, the communication list item, as shown in FIG. 4E, can be configured to display a message or symbol indicating that a video corresponding to the voice communication does not exist.

Figure 4F:

Meanwhile, it is possible to configure the mobile terminal 1, as shown in FIG. 4F, to display only communication list items for video communication (i.e., video communication list items), as shown in FIG. 4F, among all the communication list items.

In the above description for FIGS. 4A to 4F, the communication list is listed in sequence with reference to names (or phone numbers) of correspondent users. Alternatively, the communication list can be listed with reference to the stored videos. This is explained with reference to FIG. 5 as follows.

Figure 5:
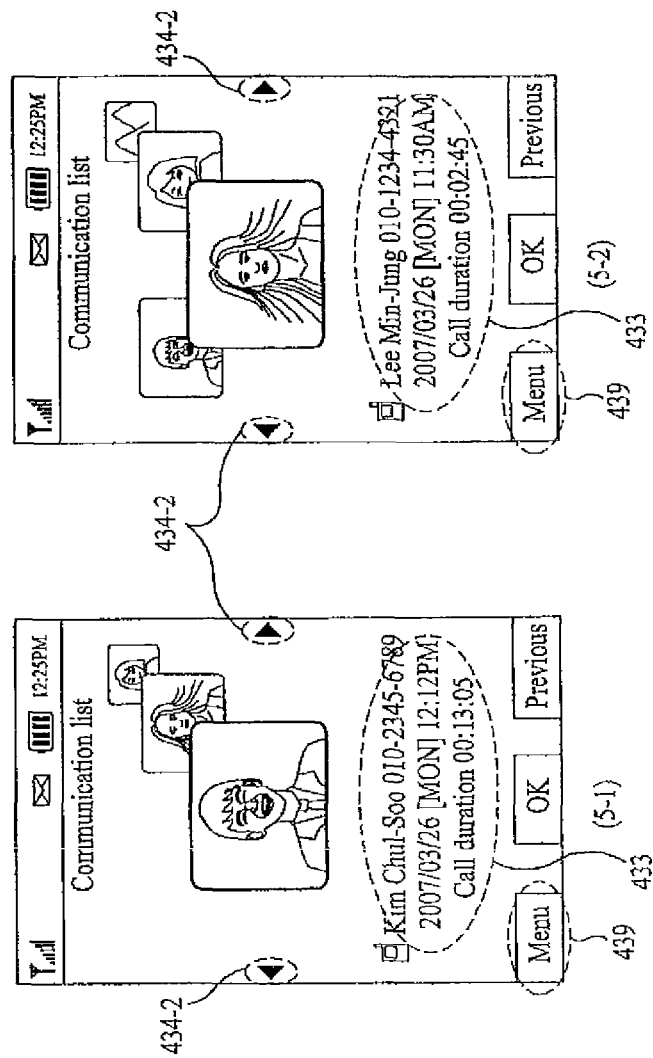

Referring to FIG. 5, the communication list can be listed with reference to the stored videos. In particular, the reception videos stored in course of the video communication session with correspondent users can be displayed in order of latest communication.

Referring to (5-1) and (5-2) of FIG. 5, if a terminal user makes a selection to discriminate a specific video from the reception videos using a navigation key (not shown in the drawing) of the input unit 500 (in FIG. 5, the specific video is selected to be displayed in a largest size), a communication list item corresponding to the selected specific video is displayed on the display unit screen 430.

In FIG. 5, the display unit 430 includes a touchscreen on which a control key for selecting the video is displayed. So, it is able configure the mobile terminal 1 in a manner that a terminal user can select a specific video by touching the control key instead of using a navigation key of the input unit 500.

Figure 6A:
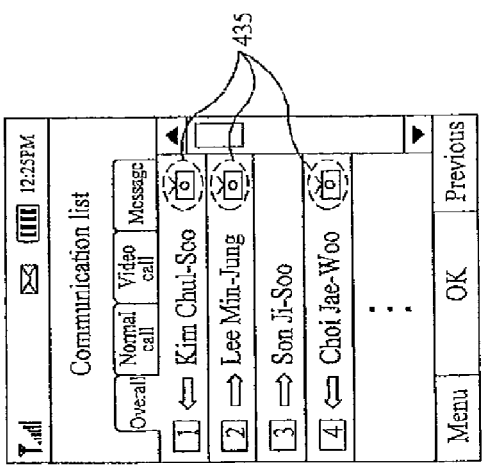
Figure 6A:
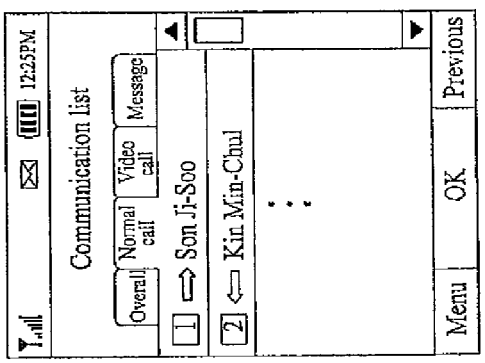
Figure 6A:
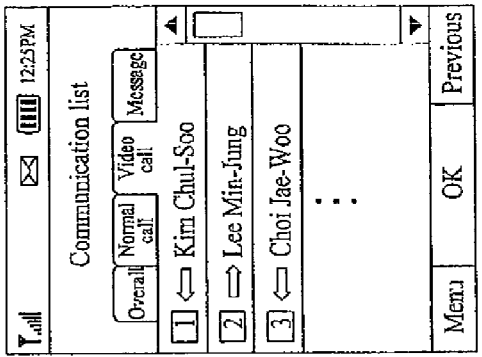

The mobile terminal 1, as shown in FIG. 6A, can be configured to display the whole communication list or a plurality of sub-lists including a normal call (i.e., voice communication), a video call (i.e., video communication), and a message in the communication list.

In particular, if an 'overall' tab is selected from the display unit screen 430, the entire communication list is displayed. Preferably, a communication list item about the video communication session among communication list items of the 'overall' tab is displayed together with a mark that indicates that the communication list item relates to the video communication session.

If a 'normal call' tab is selected from the display unit screen 430, communication list items about voice communication in the whole communication list are sorted and displayed.

If a 'video call' tab is selected, communication list items about the video communication session in the whole communication list are sorted and displayed.

Figure 6B:

If a specific communication list item is selected from the displayed communication list items, a video and detailed information on the specific communication list item, as shown in FIG. 6B, are displayed on the display unit screen 430.

Figure 7:
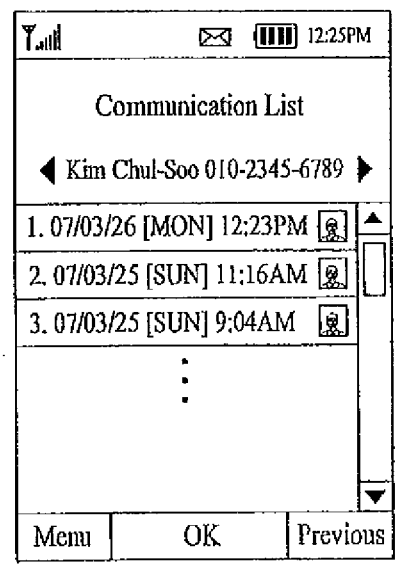
Figure 7:
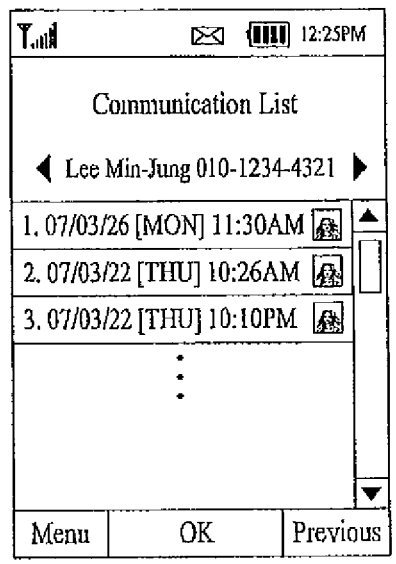

The mobile communication terminal 1, as shown in FIG. 7, can be configured to display the communication list that is sorted per a correspondent communication user.

Referring to (7-1) and (7-2) of FIG. 7, if a specific correspondent communication user is selected using right and left button keys of a navigation key (not shown in the drawings) of the input unit 500, communication list items relevant to the selected correspondent communication user are sorted and displayed.

If a specific one of the sorted communication list items is selected, a video and detailed information on the specific communication list item, as shown in FIG. 6B, are displayed on the display unit screen 430.

Figure 8A:
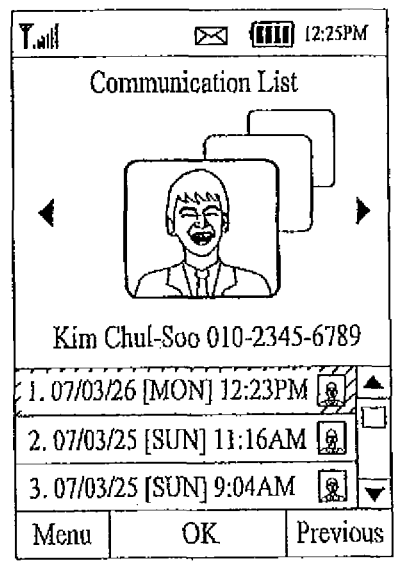

The mobile terminal 1, as shown in FIG. 8A, can be configured to display the communication list in a manner of listing the communication list items with reference to videos and as well as sorting the communication list items per a correspondent communication user.

Referring to FIG. 8A, a plurality of videos linked to the communication list items are sequentially displayed on the displayed unit screen 430 of the mobile terminal 1. If a terminal user selects one of the displayed videos, communication list items relevant to the correspondent communication user corresponding to the selected video are sorted out and displayed.

Figure 8B:
Figure 8B:

Referring to (8*b*-1) or (8*b*-2) of FIG. 8, if a specific one of the communication list items is selected, a video and detailed information on the selected specific communication list item are displayed.

In case that the video for the selected specific communication list item includes a plurality of still pictures, it is displayed as shown in (8*b*-1) of FIG. 8B.

In case that the video for the selected specific communication list item includes a moving picture, as mentioned in the foregoing description, it is displayed as shown in (8*b*-2) of FIG. 5B.

Second Embodiment

A video communication method according to a second embodiment of the present invention is explained with reference to FIGS. 9 to 11D as follows.

Figure 9:
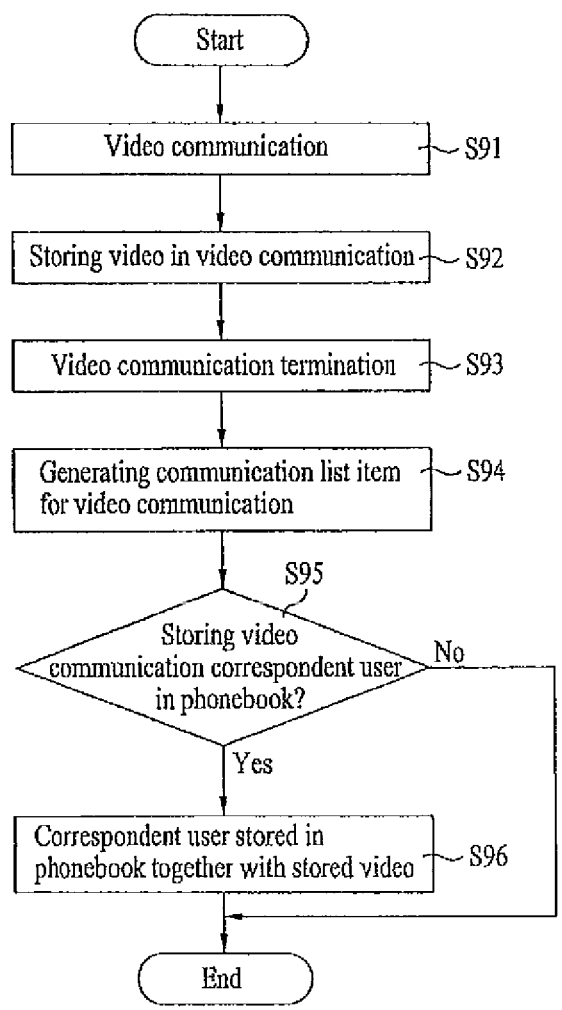
FIG. 9 is a schematic flowchart for a video communication method according to a second embodiment of the present invention.
Figure 10:
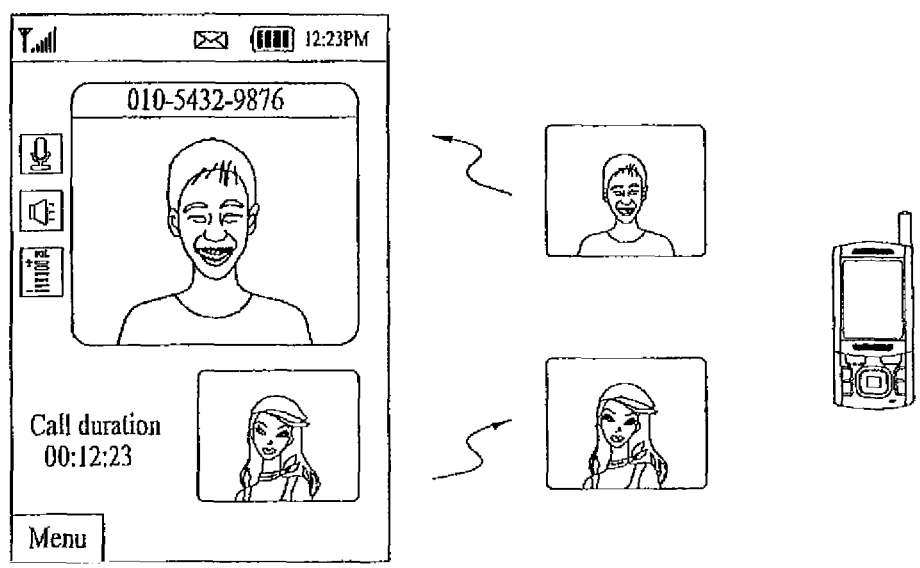
FIGS. 10 to 11D are diagrams of a screen of a display unit in a terminal that implements a video communication method according to a second embodiment of the present invention.
Figure 11A:
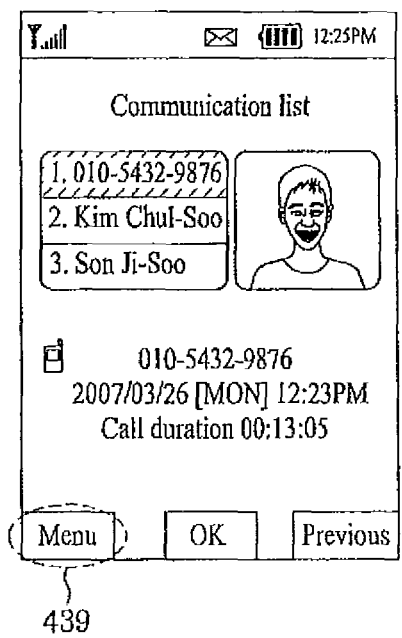
Figure 11B:
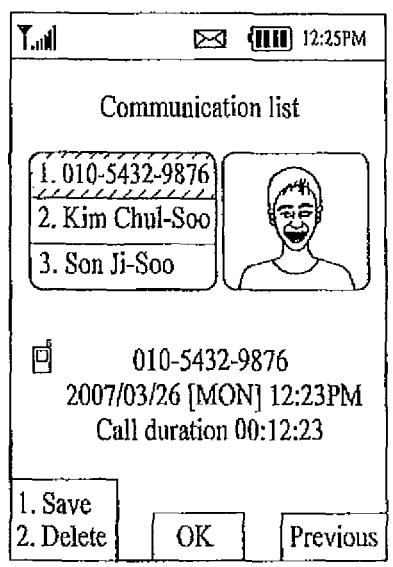
Figure 11C:
Figure 11D:
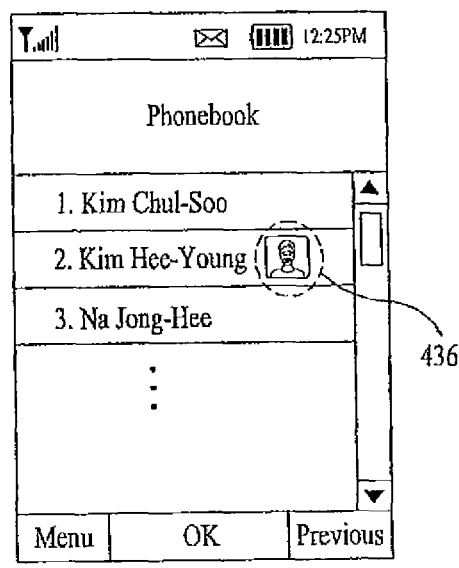

FIG. 9 is a schematic flowchart for a video communication method according to a second embodiment of the present invention, and FIGS. 10 to 11D are diagrams of a screen of a display unit in a terminal that implements a video communication method according to a second embodiment of the present invention.

Referring to FIG. 10, the mobile terminal 1 is performing video communication with a terminal 3 of a correspondent user of which information is not stored in a phonebook of the mobile terminal 1 [S91]. And, the mobile terminal 1 stores at least one of a transmission video in the course of the video communication session and a reception video in the course of the video communication session [S92]. These steps are sufficiently explained in the foregoing description for the first embodiment of the present invention and their details will be omitted in the following description.

If the video communication session is terminated [S93], a communication list item of the video communication session, as shown in FIG. 11A, is generated in the mobile terminal 1 [S94].

Subsequently, the terminal user is able to delete/store the correspondent user of the communication list item, as shown in FIG. 11B, from/in the phonebook via a manipulation of a menu 439 using the input unit 500. The menu manipulation via the input unit 500 is apparent to those skilled in the art. Details of the menu manipulation will be omitted in the following description for clarity of this disclosure.

If the terminal user makes a selection for storing information about the correspondent user of the communication list item in the phonebook, the display unit screen 430, as shown in FIG. 11C, is ready to enable the terminal user to input a name of the correspondent user together with a different phone number if necessary. And, a video stored in the course of the video communication session is displayed on the display unit screen 430. When the correspondent user information is stored in the phonebook as a phonebook record, the video displayed on the display unit screen 430 is also stored and is associated with the phonebook record [S95, S96]. If the video is already stored, the stored video may be associated with the phonebook record.

In case that there exist a plurality of videos stored in the course of the video communication session, a scheme as to which one of the videos is displayed is similar to the former scheme as to which video on the communication list is displayed according to the first embodiment of the present invention. So, the relevant explanation will be omitted for clarity of this disclosure.

After completion of the input and the video selection, the correspondent user information, as shown in FIG. 11D, is stored in the phonebook. Preferably, the phonebook is configured to display a thumbnail mark 436 indicating that the correspondent user information is stored together with the video.

Accordingly, the present invention provides the following effects or advantages.

First of all, according to the present invention, a video in the course of video communication session is stored to be displayed together with a communication list item of the video communication session. Hence, a terminal user views the stored video to be more vividly reminded of contents of the video communication session with a correspondent user in the course of the video communication session.

Secondly, according to the present invention, in case that video communication with a correspondent user not stored in a phonebook of a terminal is terminated, the correspondent user of the video communication can be stored in a phonebook together with a video stored in the course of the video communication session.

It will be apparent to those skilled in the art that various modifications and variations can be made in the present invention without departing from the spirit or scope of the inventions.

For instance, in case of sending a message (e.g., MMS (multimedia messaging system) message) to a correspondent user of which video is stored in the course of the video communication session, it is able to consider that the stored video can be sent to the correspondent user as well.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAS), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory, and executed by a controller or processor.

Thus, it is intended that the present invention covers the modifications and variations of this invention provided they come within the scope of the appended claims and their equivalents.

What is claimed is:

1. A method of performing a call session in a mobile terminal, comprising:
   establishing a call session with another terminal;
   storing a video of the established call session in a memory of the terminal if the established call session is a video call session after terminating the call session,
   displaying a call list including a plurality of call list items;
   displaying a first call list item related to the video call session in the call list; and
   displaying a second call list item related to a voice call session in the call list,
   wherein the first call list item of the video call session and the second call list item of the voice call session are concurrently displayed in a same call list together with the stored video of the video call session, and
   wherein the first call list item and the second call list item of the video call that are concurrently displayed in the same call list include a first caller identifier and a second caller identifier, respectively.

2. The method of claim 1, wherein the stored video comprises one of a still picture and a moving picture.

3. The method of claim 1, wherein the step of storing comprises:
   storing the video at a timing point selected from the group consisting of:
   a predetermined time interval timing point,
   a specific event occurrence timing point during the video call session, and
   a user-specific timing point.

4. The method of claim 2, wherein the stored video comprises a moving picture and the step of storing comprises:
   storing an audio corresponding to the video with the video when the video is stored.

5. The method of claim 4, wherein the stored audio is output when the stored video is displayed.

6. The method of claim 1, further comprising:
   storing information about a user of the another terminal or about the another terminal in a phonebook in the mobile terminal as a phonebook record; and
   associating the stored video with the phonebook record.

7. The method of claim 1, wherein the step of storing comprises:
   storing a reception video and a transmission video of the video call session.

8. The method of claim 7, further comprising: displaying the first call list item together with the reception and transmission videos.

9. The method of claim 1, further comprising:
   sending a message to another terminal; and
   sending the stored video together with the message.

10. The method of claim 3, wherein the step of displaying comprises:
    sequentially displaying plural stored videos, each stored video corresponding to a unique timing point.

11. The method of claim 1, further comprising:
    linking the stored video to the first call list item of the video call session.

12. A mobile terminal, comprising:
    a communication unit configured to establish a call session with another terminal;
    a memory;
    a display configured to display a call list including a plurality of call list items; and
    a controller configured to:
       cause the memory to store a video of the established call session in the memory if the established call session is a video call session,
       cause the display to display the call list including the plurality of call list items after terminating the call session,
       cause the display to display a first call list item related to the video call session in the call list, and
       cause the display to display a second call list item related to a voice call session in the call list,
    wherein the first call list item of the video call session and the second call list item of the voice call session are concurrently displayed in the same call list together with the stored video of the video call session, and
    wherein the first call list item and the second call list item of the video call that are concurrently displayed in the same call list include a first caller identifier and a second caller identifier, respectively.

13. The mobile terminal of claim 12, wherein the stored video comprises one of a still picture and a moving picture.

14. The mobile terminal of claim 12, wherein the controller is configured to cause the video to be stored in the memory at each timing point corresponding to a timing point selected from the group consisting of:
    a predetermined time interval timing point,
    a specific event occurrence timing point in the course of the video call session, and
    a user-specific timing point.

15. The mobile terminal of claim 13, wherein
    the stored video comprises a moving picture, and
    the controller is configured to cause an audio corresponding to the video to be stored in the memory together with the video when the video is stored in the memory.

16. The mobile terminal of claim 15, wherein the controller is configured to cause the stored audio to be output when the stored video is displayed on the display.

17. The mobile terminal of claim 12, wherein the controller is configured to cause information about a user of the another terminal or about the another terminal to be stored as a phonebook record in a phonebook in the memory, and to cause the stored video to be associated with the phonebook record.

18. The mobile terminal of claim 12, wherein the controller is configured to cause both a reception video and a transmission video of the video call session to be stored in the memory.

19. The mobile terminal of claim 18, wherein the controller is configured to cause the first call list item to be displayed on the display together with the reception and transmission videos.

20. The mobile terminal of claim 12,
    wherein, the controller is configured to cause the stored video to be transmitted together with a message when the message is transmitted by the via the communication unit to the another terminal.

21. The mobile terminal of claim 14, wherein the controller is configured cause plural stored videos to be sequentially displayed on the display, each of the plural videos corresponding to a unique timing point.

22. The mobile terminal of claim 12, wherein the controller is configured to cause the stored video to be linked to the first call list item of the video call session.

* * * * *